US00RE38780E

(19) United States
(12) Reissued Patent
Hawkes et al.

(10) Patent Number: US RE38,780 E
(45) Date of Reissued Patent: Aug. 23, 2005

(54) CURRENT MODE DC/DC CONVERTER WITH CONTROLLED OUTPUT IMPEDANCE

(75) Inventors: Charles E. Hawkes, Cary, NC (US); Michael M. Walters, Apex, NC (US); Robert H. Isham, Flemington, NJ (US)

(73) Assignee: Intersil Americas Inc., Milpitas, CA (US)

(21) Appl. No.: 10/375,914

(22) Filed: Feb. 26, 2003

Related U.S. Patent Documents

Reissue of:
(64) Patent No.: 6,181,120
Issued: Jan. 30, 2001
Appl. No.: 09/591,360
Filed: Jun. 9, 2000

U.S. Applications:

(63) Continuation of application No. 10/045,169, filed on Jan. 11, 2002.
(60) Provisional application No. 60/151,971, filed on Sep. 1, 1999.

(51) Int. Cl.[7] ..... G05F 1/56
(52) U.S. Cl. ..... 323/282; 323/285
(58) Field of Search ..... 323/282, 283, 323/280, 285, 351

(56) References Cited

U.S. PATENT DOCUMENTS

| | | | |
|---|---|---|---|
| 4,536,700 | A | 8/1985 | Bello et al. |
| 5,192,906 | A | 3/1993 | Nathan |
| 5,477,132 | A | 12/1995 | Canter et al. |
| 5,513,089 | A | 4/1996 | Sudo et al. |
| 5,514,947 | A | 5/1996 | Berg |
| 5,734,259 | A | 3/1998 | Sisson et al. |
| 5,838,147 | A | 11/1998 | Suzuki et al. |
| 5,877,611 | A | 3/1999 | Brkovic |
| 5,949,229 | A | 9/1999 | Choi et al. |
| 6,058,030 | A | 5/2000 | Hawkes et al. |
| 6,064,187 | A | 5/2000 | Redl et al. |

OTHER PUBLICATIONS

"An Embedded Pentium Pro Power Supply Using the HIP6002 (HIP6002EVAL1)", Intersil Corporation AN9668, pp. 5–11, Dec. 1996.
"A Pentium Pro Voltage Regulator Module (VRM) Using the HIP6003 PWM Controller", Intersil Corporation AN9664, pp. 1–7, Dec. 1996.

*Primary Examiner*—Adolf Berhane
(74) *Attorney, Agent, or Firm*—Fogg and Associates, LLC; David N. Fogg

(57) ABSTRACT

A DC/DC converter has an output voltage and sources an output current to a load. The DC/DC converter includes an error amplifier with a reference input and a summing input. The reference input is electrically connected to a reference voltage. The summing input is electrically connected to the output voltage and the output current. The summing input is configured for adding together the output voltage and the output current. The error amplifier issues an error signal and adjusts the error signal dependent at least in part upon the output voltage and the output current. A comparator receives the error signal. The comparator has a ramp input electrically connected to a voltage ramp signal. The comparator issues an output signal that is based at least in part upon said error input. A power switch has an on condition and an off condition, and supplies dc current to the load when in the on condition. The power switch has a control input electrically connected to the comparator output signal. The power switch is responsive to the control input to change between the on condition and the off condition to thereby adjust the output current of the DC/DC converter.

22 Claims, 3 Drawing Sheets

CURRENT MODE DC/DC CONVERTER WITH CONTROLLED OUTPUT IMPEDANCE

Matter enclosed in heavy brackets [ ] appears in the original patent but forms no part of this reissue specification; matter printed in italics indicates the additions made by reissue.

CROSS-REFERENCE TO RELATED APPLICATIONS

[This application claims the benefit of U.S. Provisional Application No. 60/151,971, filed Sep. 1, 1999.] *This Reissue Application is a continuation of Reissue Application Ser. No. 10/045,169 which is a reissue of Application Ser. No. 09/591,360 (U.S. Pat. No. 6,181,120), which claims the benefit of Provisional Application Ser. No. 60/151,971.*

FIELD OF THE INVENTION

The present invention relates to DC/DC converters.

BACKGROUND OF THE INVENTION

As the complexity and clock speed of CPUs continue to rise, greater demands are placed on the power supplies (DC/DC converters) that supply the operating voltage to the CPUs. Typically, the operating voltage of CPUs is specified with a relatively tight tolerance to ensure proper operation of the CPU. The tight tolerances on CPU operating voltages are being further narrowed as CPU clock and CPU bus speeds increase, and CPU operating voltages decrease. The decrease in permissible tolerances on CPU operating voltages has resulted in a corresponding increase in the regulation specifications of power supplies that supply operating voltages to CPUs.

The current drawn by a CPU generally undergoes frequent variation and rapid changes of substantial magnitude. For example, the current a CPU draws from a power supply may change by as much as 10–75 Amps per microsecond. These frequently varying and rapidly changing demands for substantial amounts of current are referred to as a load transients. These extreme load transients cause a corresponding voltage transient on voltage output of the power supply, thereby making it very difficult for a power supply to comply with tight power supply regulation specification. Many power supplies incorporate very large capacitors to reduce the effect of these large and rapid load transients, and thereby lessen the resultant corresponding voltage transients on the output voltage of the power supply to an acceptable level. However, the use of large capacitors adds significantly to the cost, size and weight of the power supply.

In order to reduce the number and size of capacitors needed to lessen the effect of a given load transient on power supply output voltage, a technique known as "droop" is employed. Normally, power supplies are designed to have an output voltage that is essentially independent of the load current. However, in applications where a power supply will be required to comply with tight regulation specifications in a high-local-transient environment, there is an advantage in carefully controlling and/or adjusting the output impedance of the power supply to thereby cause the power supply output voltage to decrease by a predetermined amount in response to an increase in current demanded by or being supplied to the load.

In conventional current-mode DC/DC converters, the duty cycle of the DC/DC converter is modulated by a negative-feedback voltage loop to maintain the desired output voltage. The feedback voltage loop has a DC voltage gain which determines the amount of "droop" in the output impedance of the power supply. The DC voltage gain of the feedback loop is, therefore, designed to be relatively low in order to achieve a relatively small amount of droop and thereby maintain a substantial degree of voltage regulation to comply with the tight tolerances placed upon the operating voltage supplied to the CPU.

The low DC gain in the feedback loop, however, results in any variations or offsets in the voltages within the DC/DC converter being reflected in a corresponding error in the output voltage of the converter. The only known solution to this problem is to design precise circuitry using components having tight tolerances in order to achieve low-offset voltages and/or precise internal voltages within the DC/DC converter. The inclusion of such precise circuitry adds substantially to the cost and complexity of the converter.

Therefore, what is needed in the art is a converter that maintains voltage regulation in a high-load-transient environment.

Furthermore, what is needed in the art is a converter which does not depend upon large capacitors to maintain voltage regulation in a high-load transient environment, and is therefore less expensive to build, smaller in size and lighter in weight.

Moreover, what is needed in the art is a converter which achieves voltage regulation in a high-load transient environment without the use of precision circuitry, and is therefore less complex and less expensive to build.

SUMMARY OF THE INVENTION

The present invention provides a DC/DC converter having a controlled output impedance and which provides for a controlled droop in the output voltage in response to load transients.

The invention comprises, in one form thereof, a DC/DC converter having an output voltage and sourcing an output current to a load. The DC/DC converter includes an error amplifier with a reference input and a summing input. The reference input is electrically connected to a reference voltage. The summing input is electrically connected to the output voltage and the output current. The summing input is configured for adding together the output voltage and the output current. The error amplifier issues an error signal and adjusts the error signal dependent at least in part upon the output voltage and the output current. A comparator receives the error signal. The comparator has a ramp input electrically connected to a voltage ramp signal. The comparator issues an output signal that is based at least in part upon said error input. A power switch has an on condition and an off condition, and supplies dc current to the load when in the on condition. The power switch has a control input electrically connected to the comparator output signal. The power switch is responsive to the control input to change between the on condition and the off condition to thereby adjust the output current of the DC/DC converter.

An advantage of the present invention is that droop in the output voltage of the converter in response to a load transient is controlled and reduced.

Another advantage of the present invention is that the need for a plurality of large capacitors to maintain regulation of the output voltage in a high-load transient environment is eliminated, and therefore the present invention is less expensive to manufacture, is of a lighter weight and smaller in size than conventional DC/DC converters.

A further advantage of the present invention is that it is essentially immune to errors in internal reference and offset voltages.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1A:
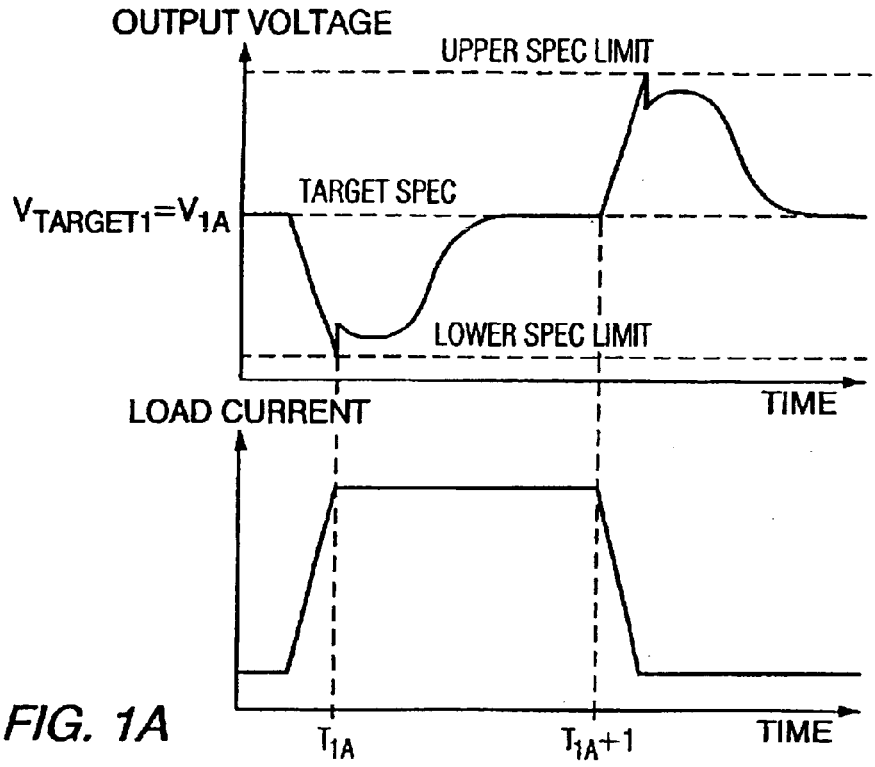
FIG. 1A includes a pair of graphs illustrating how conventional converters droop when a load is applied and then removed.

Referring now to the drawings, and particularly to FIG. 1A, the effect of a load transient upon the output voltage of a conventional converter is illustrated. The targeted no-load output voltage of the converter is $V_{TARGET1}$. The actual no-load output voltage of the converter is $V_{1A}$. In the case of FIG. 1A, $V_{TARGET1}$ is intentionally set equal to $V_{1A}$. A load current transient occurs at time $T_{1A}$, which results in a contemporaneous and corresponding droop in the converter output voltage to a level below $V_{TARGET1}$. As the demand for load current reduces at time $T_{1A}+1$, a contemporaneous and corresponding spike in the converter output voltage to a level above $V_{TARGET1}$ is observed.

Figure 1B:
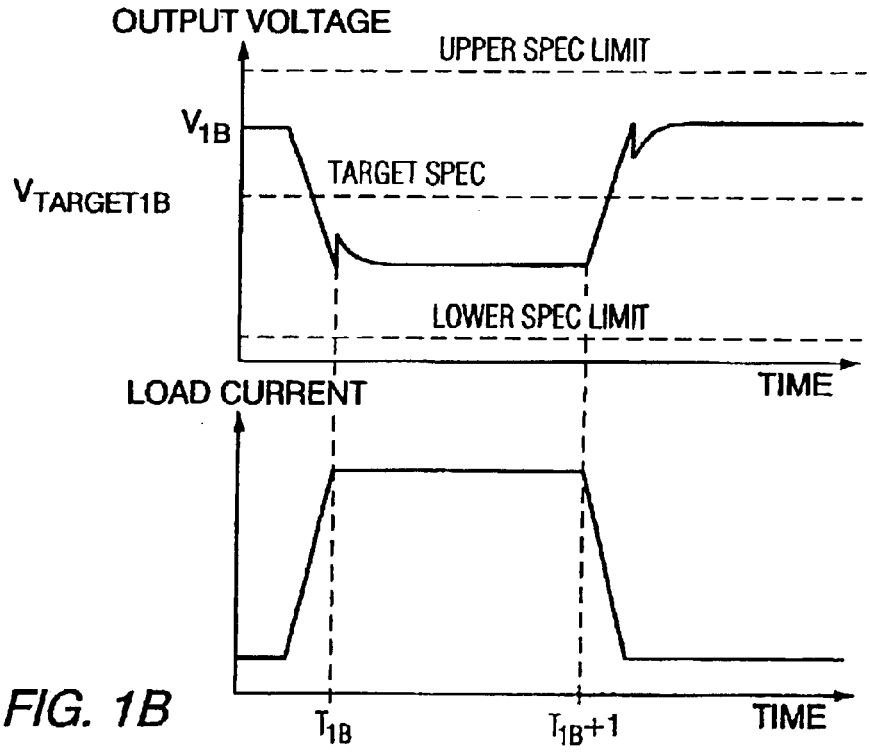
FIG. 1B includes a pair of graphs that show how the present invention improves droop when a load is applied and then removed.

Referring now to FIG. 1B, the effect of the same load current transient as shown in FIG. 1A is illustrated on a converter having a targeted no-load output voltage of $V_{TARGET2}$. However, in the case of FIG. 1B, the actual no-load output voltage of the converter $V_{1B}$ is intentionally set to be a predetermined amount greater than $V_{TARGET2}$. By intentionally setting $V_{1B}$ a predetermined amount greater than $V_{TARGET2}$, the load transient at time $T_{1B}$ results in a smaller-magnitude droop in the converter output voltage. More particularly, the droop in output voltage in FIG. 1B is only one-half the magnitude of the droop in converter output voltage observed in FIG. 1A. Thus, for a given load transient and a fixed amount of converter output capacitance, a designer can reduce by one-half the amount of droop in the output voltage of the converter by setting the actual no-load output voltage of the converter to be a predetermined amount greater than the targeted no-load output voltage. Alternatively, the amount of converter output capacitance can be dramatically reduced while maintaining a given amount of droop in the converter output voltage in response to the same given load transient by setting the actual no-load output voltage of the converter to be a predetermined amount greater than the targeted no-load voltage.

Figure 2:
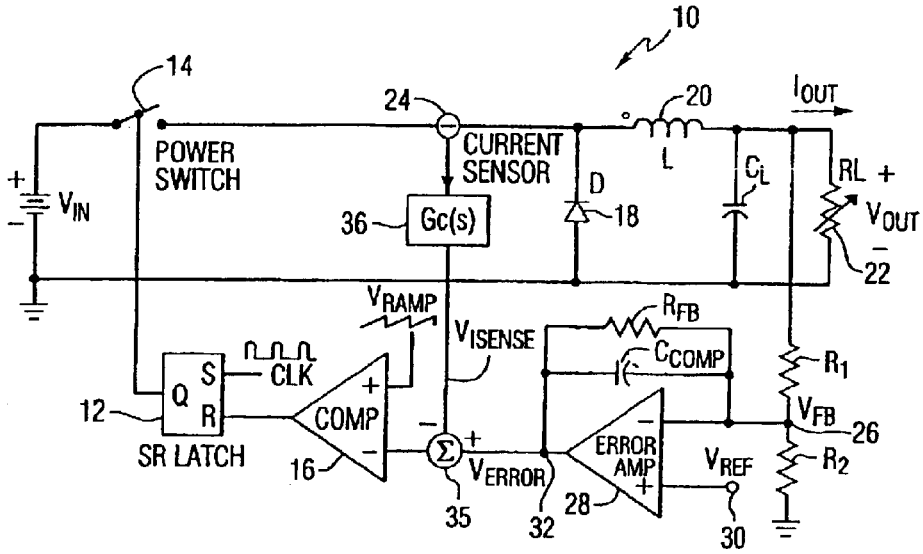
FIG. 2 is a schematic of a conventional converter.

Referring now to FIG. 2, the operation of conventional current-mode DC/DC converter 10 is described. A constant-frequency signal CLK sets SR-Latch 12 and turns on power switch 14 once per every cycle of the constant-frequency signal CLK. Power switch 14 remains on for a fraction of the cycle of the CLK signal (known as the "Duty Cycle") as determined by the output of comparator 16. During the "off-time" of power switch 14, diode 18 conducts current flowing through inductor 20 to load 22. In an alternate configuration, diode 18 is replaced by a second power switch (not shown), which is controlled in a complementary fashion to power switch 14. Such a configuration is known as Synchronous Rectification.

As will be described in more detail hereinafter, the duty cycle of DC/DC converter 10 is modulated by a negative-feedback voltage loop to maintain the desired output voltage $V_{OUT}$ across load 22. In a current-mode converter (as in FIG. 2), output voltage regulation is achieved in an indirect fashion by controlling a sensed current. The current through power switch 14 is sensed, and therefore controlled, by current sensor 24, and signal $V_{1SENSE}$, which is proportional to the current sensed by current sensor 24, is issued. However, is it to be understood that either the current through indicator 20 or the current through diode 18 can be sensed instead.

To achieve output voltage regulation, output voltage $V_{OUT}$ is sensed and divided down by the voltage divider formed by $R_1$ and $R_2$ to produce the voltage $V_{FB}$ at node 26. Error Amp 28 amplifies the difference between $V_{FB}$ and the voltage reference $V_{REF}$ at node 30 and produces the error voltage $V_{ERROR}$ at node 32. Thus, error amp 28 adjusts the $V_{ERROR}$ voltage at node 30 as needed to achieve a power switch 14 duty cycle that forces $V_{FB}$ at node 26 to be equal to $V_{REF}$. Subtraction circuit 35 subtracts $V_{1SENSE}$ from $V_{ERROR}$. Because the current sensed by current sensor 24 is subtracted from $V_{ERROR}$ is the form of $V_{1SENSE}$, error amp 28 also adjusts $V_{ERROR}$ at node 32 in accordance with $V_{1SENSE}$ to produce the needed duty cycle. This results in an effective control, or programming, of the current sensed by current sensor 24. Depending on the gain of the signal conditioning block 34, the $V_{ERROR}$ signal at node 32 can be proportional to the intra-cycle peaks of the sensed current (known as Peak Current Control) or the $V_{ERROR}$ signal may be proportional to the average value of the sensed current (known as Average Current Control).

To implement either Peak Current or Average Current Control, it is necessary to add frequency compensation to the voltage feedback loop to achieve stability. Frequency compensation is accomplished by $C_{COMP}$ and $R_1$. $C_{COMP}$ and $R_1$ add a high frequency pole into the feedback loop that cancels a zero that is due to the Equivalent Series Resistance (ESR) of the output capacitor $C_L$. Depending on the details of the circuit values, this compensating pole is sometimes not needed. The feedback resistor $R_{FB}$ is adjusted to control the DC gain of error amplifier 28, and thereby provide the desired amount of droop in the output voltage $V_{OUT}$ of converter 10. Since the voltage $V_{ERROR}$ at node 32 is proportional to $V_{1SENSE}$, which represents the current sensed by current sensor 24 and which is proportional to load current $I_{OUT}$, a reduction in DC gain will cause the output voltage $V_{OUT}$ to vary with the load current $I_{OUT}$. In this manner, a controlled droop in the output impedance of converter 10 is achieved. For example, the voltage $V_{1SENSE}$ may vary by 2V as the load current $I_{OUT}$ varies from 0 to 10 Amps. If the ratio of $R_{FB}$ to $R_1$, is equal to 10 (ten), the voltage $V_{OUT}$ will decrease by 0.1V as the load current is increased from 0 to 10 Amps (hence, "Droop").

The fundamental problem with the method of converter 10 in achieving and controlling droop resides in the low DC gain of the voltage feedback loop. The low gain is used to provide the drooping characteristic, but it also has an undesirable side-effect. As a result of this low DC gain, any variations in the $V_{RAMP}$ signal or DC offsets in current sensor 24 or comparator 16 will be reflected in a corresponding error in the voltage $V_{OUT}$. For example, if the average value of the voltage $V_{RAMP}$ has tolerance of ±200 mV, and the ratio of $R_{FB}$ to $R_1$ is equal to 20, an additional error term of ±10 mV on the voltage $V_{OUT}$ will result. The only known solution to this problem is to design precise circuitry in order to achieve low-offset voltages and/or a precise $V_{RAMP}$ voltage. The inclusion of such precise circuitry adds substantially to the cost and complexity of a DC/DC converter.

Figure 3:
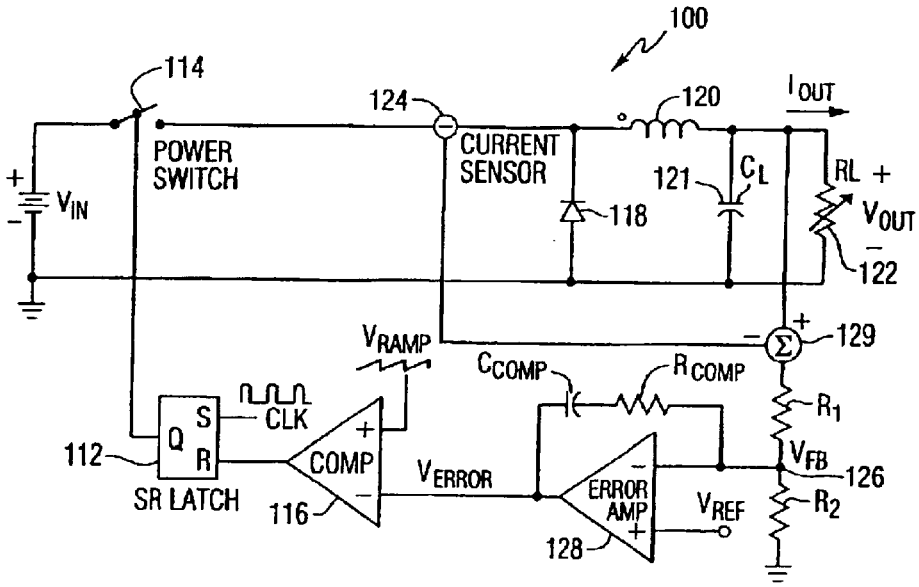
FIG. 3 is a schematic of one embodiment of a current mode DC/DC converter with controlled output impedance of the present invention.

Referring now to FIG. 3, there is illustrated one embodiment of an improved current-mode DC/DC converter 100 of the present invention. DC/DC converter 10 includes SR latch 112 having a constant-frequency signal CLK which sets latch 112 which, in turn, turns on power switch 114. Power switch 114, although shown schematically as a conventional switch, is a transistor-based switch having one or more power transistors configured to source current in response to an input signal, which is the output of latch 112. Switch 114 remains in the on state for a fraction of the period of the CLK signal, which is known as the duty cycle, as determined by comparator 116. The current flowing through load 122 is sensed by current sensor 124, which issues signal $V_{1SENSE}$. The duty cycle of power switch 114 is modulated by a negative voltage feedback loop. Voltage $V_{FB}$ at node 126 is input to error amplifier 128. Summing circuit 129 sums voltages $V_{1SENSE}$ and $V_{OUT}$. This summed voltage is then divided by a voltage divider formed by R1 and R2, thereby creating voltage $V_{FB}$ at node 126. Thus, $V_{1SENSE}$ is a component of $V_{FB}$. Error amplifier 128 compares $V_{FB}$ with $V_{REF}$, thereby creating $V_{ERROR}$. Comparator 116 compares $V_{ERROR}$ with $V_{RAMP}$. The output of comparator 116 periodically resets latch 112 to thereby determine the duty cycle of power switch 114. Error amplifier 128 includes, in its negative voltage feedback path $R_{COMP}$, and $C_{COMP}$, which provide for the frequency compensation of $V_{FB}$. The gain of error amplifier 128 is determined by the ratio of $R_{COMP}$ to $R_1$.

The most functional feature of DC/DC converter 100 is that current sensor 124 is electrically connected to the output voltage feedback loop. More particularly, $V_{1SENSE}$ is divided by the voltage divider formed by $R_1$ and $R_2$, and this divided portion forms part of $V_{FB}$. However, it is to be understood that the current through inductor 120 or the current through diode 118 can be sensed and similarly connected to the output voltage feedback loop, rather than the current through power switch 114. $V_{1SENSE}$ is connected to the voltage feedback loop without first being frequency compensated by error amplifier 128, as in conventional DC/DC converter 10 of FIG. 2. The principle advantage of not performing frequency compensation upon signal $V_{1SENSE}$ prior to the connection thereof with the output voltage feedback signal is that the gain of error amp 128 is thereby permitted to be arbitrarily high at DC (note the absence of RF), thus providing DC/DC converter 100 excellent output voltage accuracy that is essentially immune to variations in the $V_{RAMP}$ voltage and offset voltages, etc.

To understand how DC/DC converter 100 creates the desired drooping output voltage characteristic, first consider the operation of DC/DC converter 100 under a no-load condition and $I_{OUT}=0$. In this case, $V_{1SENSE}=0$, and the output voltage $V_{OUT}$ of converter 100, under this no-load condition, is given by Vref $(R_1+R_2)/R_2$. Note that $R_1$ and $R_2$ here are intentionally chosen so that the so-load output voltage of converter 100 is a predetermined amount greater than the desired target voltage. At full load, when $I_{OUT}=I_{MAX}$, $V_{1SENSE}$ will equal $V_{1SENSE,\ MAX}$, and thus we have $V_{OUT}=[V_{REF}(R_1+R_2)/R_2]-V_{1SENSE,MAX}$. Thus, as the current through load 122 increases from zero to full load current, output voltage $V_{OUT}$ decreases, or droops, by $V_{1SENSE,MAX}$ Volts.

Note especially that the same frequency compensation provided by $R_{COMP}$ and $C_{COMP}$ is applied to both the $V_{FB}$ voltage signal and the $V_{1SENSE}$ current signal. In this way, average current mode control is implemented without the need for a separate signal conditioning block (Gc(s) in FIG. 2). This is another advantage of DC/DC converter 100. Average current mode control and accurate droop are achieved using a single amplifier. The frequency compensation in DC/DC converter 10 introduces a pole at very low frequency, which is set by the characteristics of error amp 128, and a zero which is set by $R_{COMP}$ and $C_{COMP}$. For the voltage feedback loop, a high DC gain is provided, which makes the output voltage of DC/DC converter 100 essentially immune from errors in $V_{RAMP}$ and offset voltage errors. Likewise, in regards to current, the high DC gain and averaging characteristic of the frequency compensation provide excellent response to the average value of the sensed current. Because of the current-mode control, the two poles associated with the LC filter formed by inductor 120 and load capacitor 121 are split, with one pole moving to a relatively high frequency and the other pole moving to a relatively low frequency. The zero is placed before the crossover of the frequency compensation loop, which effectively cancels the effect of the low-frequency pole associated with the LC filter formed by inductor 120 and load capacitor 121. The high frequency gain of error amp 128 is determined by the ratio $R_{COMP}/R_1$. This ratio is adjusted to provide suitable high frequency current gain (and the associated pole-spliting of the LC filter poles). The high-frequency pole associated with the LC filter formed by inductor 120 and load capacitor 121 is used to compensate for the zero associated with the ESR of load capacitor 121. In this manner, a response that is essentially a single-pole response having excellent phase margin is achieved.

Figure 4A:
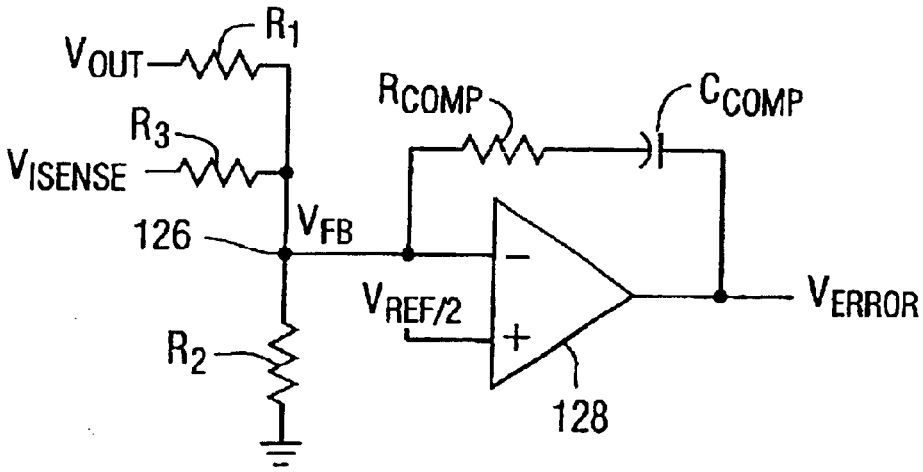
FIGS. 4A and 4B show examples of the summing circuit of FIG. 3.
Figure 4B:
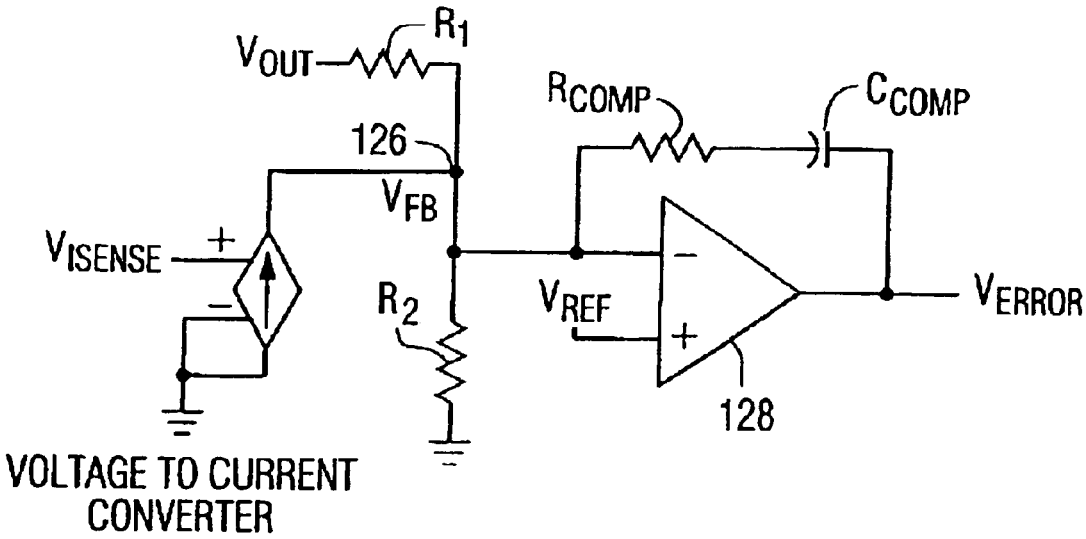

Referring now to FIGS. 4A and 4B, two practical circuits are illustrate for the summing of $V_{OUT}$ and $V_{1SENSE}$. In FIG. 4A, error amplifier 128 is configured as a summing amplifier to sum voltages $V_{OUT}$ and $V_{1SENSE}$. $R_3$ has been added between current sensor 124 and node 126. Note that, in the configuration of FIG. 4A, it is necessary to divide the voltage $V_{REF}$ by a factor of two is obtain the correct output voltage $V_{ERROR}$. In FIG. 4B, the sensed current signal is summed into the $V_{FB}$ node 126 as a current. This is a particularly useful approach, because it allows the voltage $V_{REF}$ to be used directly, rather than being divided by two, and also allows the magnitude of the droop to be easily adjusted by varying the value of $R_1$.

While this invention has been described as having a preferred design, the present invention can be further modified within the spirit and scope of this disclosure. This application is therefore intended to cover any variations, users, or adaptations of the present invention using the general principles disclosed herein. Further, this application is intended to cover such departures from the present disclosure as come within the known or customary practice in the art to which this invention pertains and which fall within the limits of the appended claims.

What is claimed is:

1. A DC/DC converter having an output voltage and sourcing an output current to a load, said DC/DC converter comprising:

an error amplifier having a reference input and a summing input, said reference input being electrically connected to a reference voltage, said summing input being electrically connected to each of the output voltage and the output current of said DC/DC converter, said summing input configured for adding together the output voltage and the output current, said error amplifier issuing an error signal and being configured for adjusting said error signal dependent at least in part upon the output voltage and the output current;

a comparative receiving said error signal, said comparator having a ramp input electrically connected to a voltage ramp signal, said comparator having a comparator output signal, said comparator output signal based at least in part upon said error input; and a power switch having an on condition and an off condition, said power supply configured for supplying dc current to the load when in said on condition, said power switch having a control input electrically connected to said comparator output signal, said power switch being responsive to said comparator output signal to change between said on condition and said off condition to thereby adjust the output current of said DC/DC converter.

2. The DC/DC converter of claim 1, wherein said power switch comprises at least one power transistor configured for supplying the output current to the load.

3. The DC/DC converter of claim 1, further comprising:

an inductor electrically connected between a first circuit node and the load, said first circuit node being disposed intermediate said power switch and the load, said inductor carrying the output circuit to the load;

a diode electrically connected between said first circuit node and ground, said diode being configured for carrying return load current, said return load current flowing from the load when said power switch is in said off condition; and a current sensor having a current input, a current output, and a sensing output, the output current flowing into said current input and out of said current output, said current output being electrically connected to said first circuit node, said current sensor being configured for sensing at least one of said kind current and said return load current and for issuing a sensor output signal representative of the output current, said sensor output signal being electrically coupled to said summing input of said error amplifier.

4. The DC/DC converter of claim 3, further comprising a voltage divider, said voltage divider having a divider input and a divider output, said divider input being electrically connected to the output voltage and to said sensing output of said current sensor, said divider output being electrically connected to said summing input of said error amplifier.

5. The converter of claim 1, further comprising a summing circuit include a voltage divider having a first resistor electrically connected between said summing input of said error amplifier and the output voltage, a second resistor electrically connected between said summing input and said sensing output of said current sensor, and a third resistor electrically connected between said summing input and ground.

6. The converter of claim 1 further comprising a summing circuit, said summing circuit including a voltage divider having an output voltage resistor electrically connected between said summing input of said error amplifier and the output voltage, a voltage to current converter for converting a voltage signal representative of the output current to a current signal, said voltage to current converter being electrically coupled to said summing input, and a second resistor connected between said summing input and ground.

[7. A member of providing droop in the output voltage of a DC/DC converter having an output current, said method comprising the steps of:

sensing the output current to thereby determine an output current signal representative of the output current;

further sensing the output voltage to thereby determine an output voltage signal representative of the output voltage;

summing said output carrier signal and said output voltage signal to thereby determine a voltage feedback signal;

comparing said voltage feedback signal with a reference voltage to thereby determine an error signal;

further comprising said error signal to a ramp voltage signal to thereby determine a current control signal; and controlling the output voltage based at least in part upon said current control signal.]

[8. The method of claim 7, wherein said sensing step comprises sensing the output current with a current sensor, said current sensor issuing said output current signal.]

[9. The method of claim 7, wherein said summing step comprises a summing circuit configured for adding together said output current signal and said output voltage signal.]

[10. The method of claim 7, wherein said comparing step comprises an error amplifier having a summing input, each of said output current signal and said output voltage signal being electrically connected to said summing input, said error amplifier having a reference input electrically connected to a reference voltage supply, said error amplifier issuing an error signal representative of a difference between the sum of said output current signal and said current voltage signal and the reference voltage.]

[11. The method of claim 7, wherein said further comparing step comprises a comparator having a first input electrically connected to said error signal and a second input connected to a voltage ramp signal, said comparator comparing said error signal to said voltage ramp signal and issuing said current control signal.]

[12. The method of claim 7, wherein said controlling step comprises electrically connecting said current control signal to at least one power transistor, said power transistor configured for adjustably sourcing the output current in response to said current control signal.]

*13. A controller for a DC/DC converter having an output voltage and sourcing an output current to a load, the controller comprising:*

*at least one first node adapted to receive a signal representative of the output current;*

*at least one second node to receive a signal representative of the output voltage;*

*an error amplifier, responsive to the signal representative of the output current from the at least one first node and the signal representative of the output voltage from the at least one second node, and adapted to issue an error signal dependent at least in part upon the signal representative of the output voltage, the signal representative of the output current and a first reference signal;*

*a comparator, responsive to the error amplifier, the comparator adapted to issue a comparator output signal, the comparator output signal based at least in part upon the error signal and a second reference signal; and*

*an output circuit, responsive to the comparator output signal, and adapted to provide a control signal based at least in part upon the comparator output signal that controls the DC/DC converter.*

*14. A controller for a DC/DC converter having an output voltage and sourcing an output current to a load, the controller comprising:*

*an error amplifier adapted to issue an error signal dependent at least in part upon a signal representative of the output voltage, a signal representative of the output current and a first reference signal;*

*a comparator, responsive to the error signal from the error amplifier, the comparator adapted to issue a comparator signal, the comparator signal based at least in part upon the error signal and a second reference signal; and*

*an output circuit, responsive to the output signal from the comparator, and adapted to provide a control signal based at least in part upon the comparator signal, wherein the control signal controls the DC/DC converter.*

*15. A circuit for controlling a DC/DC converter having an output current and an output voltage, the circuit comprising:*

*a circuit that combines a signal representative of the output current, a signal representative of the output voltage and a first reference signal to thereby determine an error signal;*

*a comparator, responsive to the error signal, that is adapted to compare the error signal to a second reference signal to thereby determine a control signal; and*

*an output circuit, responsive to the control signal from the comparator, the output circuit controlling the DC/DC converter based at least in part upon said control signal.*

*16. The controller of claim 13, wherein the output circuit comparator an SR latch.*

*17. The controller of claim 13, wherein the second reference signal comprises a ramp signal.*

*18. The controller of claim 13, further including a summer circuit coupled to one input of the error amplifier to combine at least two of the signal representative of the output voltage, the signal representative of the output current and the first reference signal.*

*19. The controller of claim 14, wherein the output circuit comprises an SR latch.*

*20. The controller of claim 14, wherein the second reference signal comprises a ramp signal.*

*21. The controller of claim 14, and further including a summer circuit coupled to one input of the error amplifier to combine at least two of the signal representative of the output voltage, the signal representative of the output current and the first reference signal.*

*22. A DC/DC converter having an output voltage and sourcing an output current to a load, the converter comprising:*

*at least one power switch;*

*an inductor, coupled to the at least one power switch, the inductor passing the output current and providing the output voltage for the converter;*

*a current sense circuit, coupled to the power switch, that produces a signal representative of the output current;*

*a feedback path, coupled to the output of the inductor, adapted to carry a signal representative of the output voltage;*

*an error amplifier, responsive to the signal representative of the output current from the current sense circuit and the signal representative of the output voltage from the feedback path, and adapted to issue an error signal dependent at least in part upon the signal representative of the output voltage, the signal representative of the output current and a first reference signal;*

*a comparator, responsive to the error signal from the error amplifier, the comparator adapted to issue a comparator output signal, the comparator output signal based at least in part upon the error signal and a second reference signal; and*

*wherein the at least one power switch is controlled based at least in part upon the comparator output signal.*

*23. The converter of claim 22, wherein the second reference signal comprises a ramp signal.*

*24. The converter of claim 22, and further including a summer circuit coupled to one input of the error amplifier to combine at least two of the signal representative of the output voltage, the signal representative of the output current and a first reference signal.*

*25. A DC/DC converter having an output voltage and sourcing an output current to a load, the converter comprising:*

*at least one power switch;*

*an inductor, coupled to the at least one power switch, the inductor passing the output current and providing the output voltage for the converter;*

*a current sense circuit, coupled to the power switch, that produces a signal represenative of the output current;*

*a feedback path, coupled to the output of the inductor, adapted to carry a signal representative of the output voltage;*

*an error amplifier, responsive to the signal representative of the output current from the current sense circuit and the signal representative of the output voltage from the feedback path, and adapted to issue an error signal dependent at least in part upon the signal representative of the output voltage, the signal representative of the output current and a first reference signal;*

*a comparator, responsive to the error signal from the error amplifier, the comparator adapted to issue a comparator output signal, the comparator output signal based at least in part upon the error signal and a second reference signal;*

*an output circuit, responsive to the comparator output signal from the comparator, and adapted to provide a control signal to the power switch based at least in part upon the comparator signal to control the output current and output voltage of the converter.*

*26. The converter of claim 25, wherein the second reference signal comprises a ramp signal.*

*27. The converter of claim 25, and further including a summer circuit coupled to one input of the error amplifier to combine at least two of the signal representative of the output voltage, the signal representative of the output current and a first reference signal.*

*28. A circuit comprising:*

*a functional circuit; and*

*a DC/DC converter having an output voltage and sourcing an output current to the functional circuit, the converter comprising:*

*at least one power switch,*

*an inductor, coupled to the at least one power switch, the inductor passing the output current and providing the output voltage for the converter,*

*a current sense circuit, coupled to the power switch, that receives a signal representative of the output current;*

*a feedback path, coupled to the output of the inductor, adapted to carry a signal representative of the output voltage,*

*an error amplifier, responsive to the signal representative of the output current from the current sense circuit and the signal representative of the output voltage from the feedback path, and adapted to issue an error signal dependent at least in part upon the signal representative of the output voltage, the signal representative of the output current and a first reference signal,*

*a comparator, responsive to the error signal from the error amplifier, the comparator adapted to issue a comparator output signal, the comparator output signal based at least in part upon the error signal and a second reference signal, and*

*wherein the at least one power switch is controlled based, at least in part upon the comparator output signal.*

* * * * *

UNITED STATES PATENT AND TRADEMARK OFFICE

CERTIFICATE OF CORRECTION

PATENT NO. : RE 38,780 E
APPLICATION NO. : 10/375914
DATED : August 23, 20005
INVENTOR(S) : Hawkes et al.

It is certified that error appears in the above-identified patent and that said Letters Patent is hereby corrected as shown below:

Column 7, line 11, please replace the phrase "a comparative" with --a comparator--

Column 7, line 44, please replace the phrase "of said kind current" with --of said load current--

Signed and Sealed this

Twenty-ninth Day of April, 2008

JON W. DUDAS
*Director of the United States Patent and Trademark Office*